(No Model.)
P. A. CHEVALIER.
BICYCLE LOCK.
No. 587,793.  Patented Aug. 10, 1897.
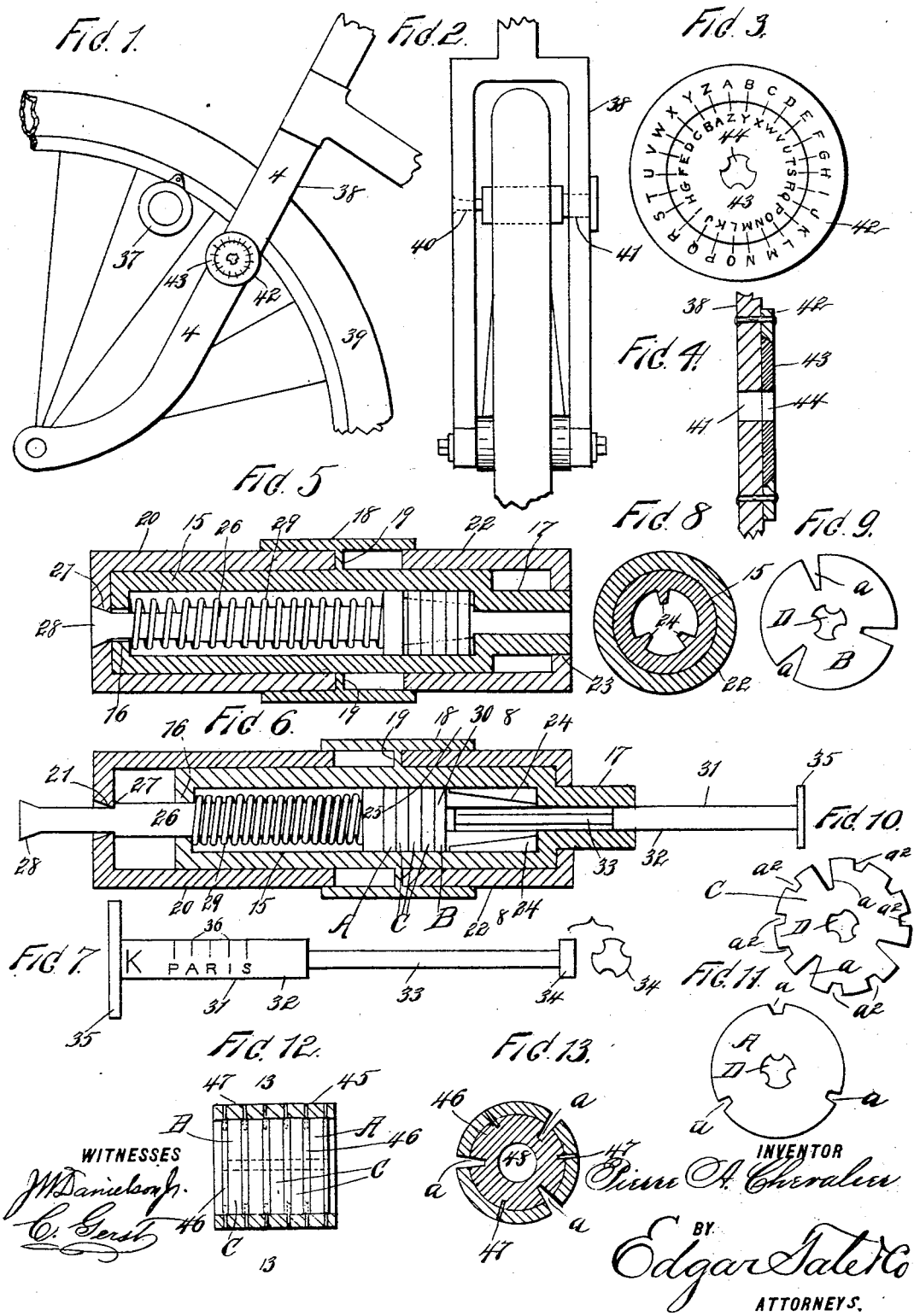
WITNESSES
J. W. Danielson Jr.
C. Gerst
INVENTOR
Pierre A. Chevalier
BY
Edgar Tate & Co
ATTORNEYS.
THE NORRIS PETERS CO., PHOTO-LITHO., WASHINGTON, D. C.

UNITED STATES PATENT OFFICE.

PIERRE ALEXANDER CHEVALIER, OF UNIONVILLE, NEW YORK.

BICYCLE-LOCK.

SPECIFICATION forming part of Letters Patent No. 587,793, dated August 10, 1897.

Application filed January 13, 1897. Serial No. 619,025. (No model.)

*To all whom it may concern:*

Be it known that I, PIERRE ALEXANDER CHEVALIER, a citizen of the Republic of France, residing at Unionville, in the county of Westchester and State of New York, have invented certain new and useful Improvements in Bicycle-Locks, of which the following is a full and complete specification, such as will enable those skilled in the art to which it appertains to make and use the same.

This invention relates to locks for bicycles and similar vehicles; and the object thereof is to provide an improved combination-lock for vehicles of this class which may be applied thereto whenever desired and which cannot be opened or unlocked except by one possessing a knowledge of the combination.

The invention is fully disclosed in the following specification, of which the accompanying drawings form a part, in which—

Figure 1 is a side view of a portion of a bicycle provided with my improvement; Fig. 2, a back view thereof; Fig. 3, a plan view of a part of my improved lock, which is secured to the vehicle; Fig. 4, a section on the line 4 4 of Fig. 1; Fig. 5, a longitudinal central section of the body portion of the lock; Fig. 6, a similar view showing the parts in a different position; Fig. 7, a side and end view of the key; Fig. 8, a section on the line 8 8 with the key removed; Figs. 9, 10, and 11, plan views of different combination-disks which I employ; Fig. 12, a section of a modified form of construction, and Fig. 13 a section on the line 13 13 of Fig. 12.

In the drawings forming part of this specification the separate parts of my improvement are designated by letters and numerals of reference throughout the several views, and in the practice of my invention I provide a lock for the purpose herein specified, the main portion of which consists of a tube 15, which is provided at one end and centrally thereof with an opening 16 and at the other end with a reduced extension 17, and mounted centrally of the tube 15 is a concentric tubular casing 18, which is connected therewith by radial arms 19.

Mounted on the tube 15, at one end thereof, is a tubular sleeve 20, the inner end of which fits between the corresponding end of the casing 18 and the tube 15 and which is provided centrally of its outer end with an opening 21, the walls of which are beveled outwardly in such manner that the outer portion of said opening is larger than the inner portion thereof, and on the opposite end of the tube 15 is a similar tubular sleeve 22, the inner end of which is open and adapted to slide within the casing 18 and the outer end of which is provided with a central opening 23, through which the tubular extension 17 of the tube 15 is adapted to pass.

Formed in the end of the tube 15, adjacent to the tubular extension 17, are radial ribs 24, which decrease in size or width from the end of the tube inwardly, as clearly shown in Figs. 5 and 6, and three of these ribs are preferably employed, as shown in Fig. 8, and mounted in said tube is a piston or plunger 25, provided with a shaft 26, which extends outwardly through the opening 16 in the end of the tube 15, and the opening 21 in the end of the sleeve 20 of said shaft is provided with an annular shoulder 27 and with a head 28, which is adapted to fit in the enlarged opening 21 in the end of the tubular sleeve 20, but cannot pass inwardly through said opening, and mounted on said shaft is a spiral spring 29, one end of which bears upon the plunger or piston 25 and the other end on the end of the tube 15. I also provide a plurality of disks 30, which, as shown in the drawings, are five in number, but the number of which may vary, and the inner or last disk is designated by the reference-letter A and the outer or first disk by the reference-letter B, and the three intermediate disks are each designated by the reference-letter C.

The last disk A is shown in Fig. 11, the first disk B in Fig. 9, and one of the intermediate disks C is shown in Fig. 10, and each of these disks is provided with three radial notches or recesses $a$, which correspond with the ribs 24 in the tube 15, and the notches or recesses $a$ in the outer or first disk B are deeper than those in the inner or last disk A, while the notches or recesses in the intermediate disks C decrease in depth from the first or outer disk B to the last or inner disk A, and the intermediate disks C are each provided with supplemental notches or recesses $a^2$, eight of which are preferably employed. I also employ a key 31, which is shown in Figs. 6 and 7 and which consists of a main shaft 32, provided with an extension 33, at the end of which is a head 34, and the outer end of the shaft 32 is provided with a cross-head or handle 35, and in practice I select five letters or a word consisting of five letters, and these letters are placed on the shaft 31 of the key, and said shaft is provided with a corresponding number of notches or marks 36 and also with the letter "K," and I also secure to the rim of the wheel of the bicycle or other vehicle a ring 37, through which the casing 18 of the body portion of the lock is adapted to be passed, and I form in the sides of the yoke 38, in which the guide-wheel 39 is mounted, openings 40 and 41, which are shown in dotted lines in Fig. 2 and one of which is shown in full lines in Fig. 4, and the side of the yoke 38 in which the opening 41 is formed is also shown in section in Fig. 4.

The head 34 of the key is irregular in form, as shown in Fig. 7, and each of the disks 30, including the inner or last disk A, the outer or first disk B, and the three intermediate disks C, is provided with a central opening D, which is similar in form to the head of the key, and rigidly mounted on the outer side of the fork 38, or that side thereof in which the opening 41 is formed, is a ring 42, within which is mounted a disk 43, which is provided with a central opening 44 similar to the openings D in the disks 30.

The disk 43 is free to revolve within the ring 42 and is adapted to be revolved by the head of the key of the shaft thereof, and the main part 32 of the shaft of the key is similar in form in cross-section to the head 34 thereof.

The ring 42, which is rigidly secured to the yoke, is provided with the letters of the alphabet, which are arranged in regular order thereon, and the disk 43 is provided with the same letters arranged in the reverse order, and the operation will be readily understood from the foregoing description when taken in connection with the accompanying drawings and the following statement thereof.

The main or body portion of the lock is adapted to be passed through the ring 37 and between the separate sides of the yoke 38 in such manner that the tubular extension 17 of the tube 15 and the opening 21 in the ends of the tubular sleeve 20 will register with the openings 40 and 41 in the sides of the yoke 38 when the wheel is turned into proper position, and then by manipulating the casing 18 the extension 17 of the tube 15 may be forced into the opening 41 in the yoke 38. The key is then inserted, and the disks 30 are forced inwardly into the position shown in Fig. 6, when the outer end of the shaft 26 will be forced through the opening 40 in the opposite side of the yoke 38, after which the key is turned and manipulated until it is passed through all of the disks 30 up to the last disk A. This operation disarranges the disks 30, so that they cannot be forced outwardly by the spring 29, by reason of the fact that the notches or recesses $a$ therein no longer correspond in position with the position of the beads or ribs 24 in the tube 15.

After the disks have been forced backwardly into the position shown in Fig. 6 by the head of the key it will be understood that the key must be turned so that the head 34 thereof will enter the corresponding opening B in the first disk, after which the head of the key must be so turned that it will enter the corresponding central opening in the next disk C, and so on until the key or the head thereof has been passed through all of the intermediate disks, and in manipulating the key so as to pass it through the disks mentioned the first disk and the disks C in their respective order are each turned so that the above result is produced, and the parts of the lock will be in the position shown in Fig. 6.

In order to unlock the apparatus, the disks 30 may be turned so that the notches or recesses $a$ in all of them will correspond in position with the ribs 24, formed in the tube 15, and this can only be done in the following manner: Supposing the apparatus to be provided with five of the disks 30, as herein described, and the secret or combination word for opening the lock consisted of the letter "K," followed by the letters of the word "Paris," as shown and described. The key is inserted through the ring 42, the disk 43, and into the tubular extension 17 of the tube 15, and into said tube until the letter "P" of the word "Paris," which is found on the shaft of the key, reaches the opening in the disk 43. The key is then turned until the letter "P" on the disk 43 comes opposite the letter "K" on the ring 42. The key is then drawn out till the next letter "A" of the key comes to the surface of the disk 43 and is then turned until the letter "A" of the disk 43 comes opposite to the letter "K" of the ring 42, and this operation is repeated with the letters "R," "I," and "S" on the key, and at the instant that the inner or last disk A is so manipulated the spring 29 will force the plunger or piston 25 inwardly and the lock will be operated, the disks 30 and the key being forced outwardly by said spring and the shaft 26 being drawn inwardly, as will be readily understood.

The object of the small notches or recesses $a^2$, with which all the intermediate disks C are provided, is to render all opening of the apparatus or the unlocking of the same impossible by any other person than the one in possession of the combination, and without these notches or recesses it would be comparatively easy for one possessing the key to turn the said disks and bring the notches or recesses $a$ into line with the ribs 24.

The employment of the supplemental notches or recesses $a^2$ in the intermediate disks renders this operation practically impossible, and the difficulty is also increased rather than diminished by omitting the supplemental notches or recesses in the first or outer disk B.

It will be understood that the difficulty of unlocking the apparatus may be increased by increasing the number of the disks, and it will be apparent that the number of these disks 30 may be increased to any desired extent, the letters on the shaft 32 of the key being always so arranged as to correspond with the number of said disks independently of the letter "K," which is also necessarily employed, as herein shown and described.

The small or supplemental notches or recesses $a^2$ may be of any desired depth, and the same may, if desired, be all of unequaled dimensions, though always smaller or of less depth than the notches or recesses $a$, and it will be observed that in the operation of the device, as hereinbefore described, by means of the key the disk 14 is turned within the ring 42 by means of the main shaft 32 of the key, and the operation of the apparatus depends almost entirely on the form of the central openings in the disks 30 and the position of said openings with reference to the main notches or recesses $a$ and the fact that the key can only enter the disks when the latter are in a certain position or when the key is held in a certain position, and by varying the position of the openings in regard to said larger notches or recesses $a$ it becomes necessary to turn the key, and consequently the disk 43, in a different way or direction in order that the notches or recesses $a$ may correspond in position with the position of the ribs 24 in the tube 15.

In order to detach or unlock the apparatus, as hereinbefore described, it becomes necessary to turn the disks so that their larger notches or recesses $a$ may be in line with the ribs 24, and in this operation it is necessary to begin with the inner disk A and work each successive disk into its proper position. When the disks are loosely mounted in the tube 15 and are flush with or adjacent to each other, this operation is difficult by reason of the fact that one of said disks in the manipulation thereof may turn the inner one adjacent thereto, which has already been properly located, and in order to prevent this a number of devices may be provided; and in Figs. 12 and 13 I have shown one form of device or construction by which this result may be accomplished. This device consists of a tube 45, in which the disks 30 are mounted, and between said disks, which are also designated by the reference-letters A, B, and C, are placed disks 46, which are secured in place by pins 47, and each of which is provided with a large central opening 48, through which the head of the key may be passed, and these stationary disks 46 are also provided with notches or recesses $a$ similar to those formed in the disks 30, and the tube 45 is similarly provided, said tube being split longitudinally at three different points, as clearly shown in Fig. 13, so as to correspond with the position of the notches or recesses $a$ and also with the ribs 24 in the tube 15, and it will be understood that the tube 45 moves longitudinally with the disks 30, while said disks 30 are free to revolve therein, the disks 46, by which they are separated, being held stationary. This device is perfectly adapted to prevent the accidental turning of the disks 30 in the manipulation thereof by the key, as hereinbefore described, and it will be apparent that other changes in and modifications of the construction herein described may be made without departing from the spirit of my invention or sacrificing its advantages.

It will also be apparent that instead of forming the holes or openings 40 and 41 in the sides of the yoke 38 I may secure brackets or clamps to said yoke, at each side thereof, in which the holes 40 may be formed, and thus avoid the cutting or weakening of the sides of said yoke.

Although I have described the sleeves 20 and 22 as being formed separately and independently movable, said sleeves may be connected and form a single sleeve or casing, in which event said sleeve or casing will be provided with longitudinal slots in its opposite sides, through which the radial arms 19 will pass, and if said sleeves be formed separately, as herein described, it will be necessary to provide means to prevent them from being detached from the tube 15.

Having fully described my invention, I claim as new and desire to secure by Letters Patent—

1. A lock for bicycles and similar vehicles which is adapted to be passed through a ring or keeper secured to the rim of one of the wheels of the vehicle, said lock consisting of two telescopic parts, the outer part being tubular in form, and being provided at one end with a reduced tubular extension, and with an opening at the opposite end, and the inner part being spring-operated, and adapted to be projected through said opening, the reduced end of the outer part and the projected end of the inner part being adapted to engage with the sides of the fork in which said wheel is mounted, and means for locking the inner part in a projected position, substantially as shown and described.

2. A lock for bicycles and similar vehicles which is adapted to be passed through one of the wheels, and to be connected with the fork in which said wheel is mounted, said lock consisting of a main central tube which is provided at one end with a tubular extension, and at the other with an opening, said tube being also provided centrally with a concentric casing which is secured thereto, and at each end with a tubular sleeve, in which said central tube is adapted to move, one of said sleeves being provided with an opening through which said tubular extension passes, and the other with an opening which corresponds with that formed in the adjacent end of the central tube, said inner tube being also provided with a movable piston or plunger, and a shaft which passes through one end of the central tube, and through the end of the corresponding sleeve mounted thereon, and on which a spring is mounted, which is adapted to force said piston or plunger and said shaft inwardly, and means for operating said piston or plunger and said shaft and for locking the latter and the central tube in the projected position, substantially as shown and described.

3. A lock for bicycles and similar vehicles, which is adapted to be passed through one of the wheels, and to be connected with the fork in which said wheel is mounted, said lock consisting of a main central tube which is provided at one end with a tubular extension, and at the other with an opening, said tube being also provided centrally with a concentric casing which is secured thereto, and at each end with a tubular sleeve, in which said central tube is adapted to move, one of said sleeves being provided with an opening through which said tubular extension passes, and the other with an opening which corresponds with that formed in the adjacent end of the central tube, said inner tube being also provided with a movable piston or plunger, and a shaft which passes through one end of the central tube, and through the end of the corresponding sleeve, mounted thereon, and on which a spring is mounted, which is adapted to force said piston or plunger and said shaft inwardly, and means for operating said piston or plunger and said shaft, consisting of a plurality of disks mounted in the end of said central tube, adjacent to the tubular extension thereof, said disks being provided in their perimeters with notches or recesses, and said tube with corresponding ribs, and means for manipulating said disks, substantially as shown and described.

4. A lock for bicycles and similar vehicles, which is adapted to be passed through one of the wheels, and to be connected with the fork in which said wheel is mounted, said lock consisting of a main central tube which is provided at one end with a tubular extension, and at the other with an opening, said tube being also provided centrally with a concentric casing which is secured thereto, and at each end with a tubular sleeve, in which said central tube is adapted to move, one of said sleeves being provided with an opening through which said tubular extension passes, and the other with an opening which corresponds with that formed in the adjacent end of the central tube, said inner tube being also provided with a movable piston or plunger, and a shaft which passes through one end of the central tube, and through the end of the corresponding sleeve mounted thereon, and on which a spring is mounted, which is adapted to force said piston or plunger and said shaft inwardly, and means for operating said piston or plunger and said shaft, consisting of a plurality of disks mounted in the end of said central tube, adjacent to the tubular extension thereof, said disks being provided in their perimeters with notches or recesses, and said tube with corresponding ribs, and means for manipulating said disks, consisting of a key, the shaft of which is provided with a number of letters or with characters which correspond with said disks, and a ring secured to said yoke of the frame of the vehicle, on which are formed the letters of the alphabet, a disk mounted in said ring, which is also provided with the letters of the alphabet arranged in the reverse order, said parts being constructed, combined and arranged, substantially as shown and described.

5. A lock for bicycles and similar vehicles, which is adapted to be passed through one of the wheels and to be connected with the fork in which said wheel is mounted, said lock consisting of a main central tube which is provided at one end with a tubular extension, and at the other with an opening, said tube being also provided centrally with a concentric casing which is secured thereto, and at each end with a tubular sleeve, in which said central tube is adapted to move, one of said sleeves being provided with an opening through which said tubular extension passes, and the other with an opening which corresponds with that formed in the adjacent end of the central tube, said inner tube being also provided with a movable piston or plunger, and a shaft which passes through one end of the central tube, and through the end of the corresponding sleeve mounted thereon, and on which a spring is mounted, which is adapted to force said piston or plunger and said shaft inwardly, and means for operating said piston or plunger and said shaft, consisting of a plurality of disks mounted in the end of said central tube, adjacent to the tubular extension thereof, said disks being provided in their perimeters with notches or recesses, and said tube with corresponding ribs, and means for manipulating said disks, consisting of a key, the shaft of which is provided with a number of letters or with characters which correspond with said disks, and a ring secured to said yoke of the frame of the vehicle, on which are placed the letters of the alphabet, a disk mounted in said ring, which is also provided with the letters of the alphabet arranged in the reverse order, said disks being each provided with a central opening which is irregular in form, and the head of the key and that portion of the shaft on which the letters or characters are placed being similar in form, substantially as shown and described.

In testimony that I claim the foregoing as my invention I have signed my name, in presence of the subscribing witnesses, this 8th day of January, 1897.

PIERRE ALEXANDER CHEVALIER.

Witnesses:
CHARLES S. ROGERS,
C. GERST.